US012784768B2

(12) United States Patent
Yang et al.

(10) Patent No.: US 12,784,768 B2
(45) Date of Patent: Nov. 3, 2026

(54) REVERB AND NOISE ROBUST VOICE ACTIVITY DETECTION BASED ON MODULATION DOMAIN ATTENTION

(71) Applicant: Dolby Laboratories Licensing Corporation, San Francisco, CA (US)

(72) Inventors: Shaofan Yang, Beijing (CN); Kai Li, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 85 days.

(21) Appl. No.: 18/682,416

(22) PCT Filed: Aug. 11, 2022

(86) PCT No.: PCT/US2022/040076

§ 371 (c)(1),
(2) Date: Feb. 8, 2024

(87) PCT Pub. No.: WO2023/018880

PCT Pub. Date: Feb. 16, 2023

(65) Prior Publication Data

US 2025/0131941 A1 Apr. 24, 2025

Related U.S. Application Data

(60) Provisional application No. 63/239,976, filed on Sep. 2, 2021.

(30) Foreign Application Priority Data

Aug. 12, 2021 (WO) ................ PCT/CN2021/112265
Oct. 28, 2021 (EP) .................................... 21205203

(51) Int. Cl.

| | |
|---|---|
| ***G10L 25/00*** | (2013.01) |
| ***G10L 21/0208*** | (2013.01) |
| ***G10L 25/87*** | (2013.01) |

(52) U.S. Cl.
CPC .......... *G10L 25/87* (2013.01); *G10L 21/0208* (2013.01); *G10L 2021/02082* (2013.01)

(58) Field of Classification Search
None
See application file for complete search history.

(56) References Cited

U.S. PATENT DOCUMENTS 6,570,991 B1 5/2003 Scheirer
8,831,934 B2 * 9/2014 Harsch ..................... H04R 3/02 381/20

(Continued)

FOREIGN PATENT DOCUMENTS

JP H06295196 A 10/1994
JP 2019090930 A 6/2019
WO WO-2014168777 A1 * 10/2014 ............. G10L 25/21

OTHER PUBLICATIONS

Morita Shota et al: "Robust Voice Activity Detection Based on Concept of Modulation Transfer Function in Noisy Reverberant Environments", Journal of Signal Processing Systems, Springer, US, vol. 82, No. 2, Jun. 11, 2015 (Jun. 11, 2015), pp. 163-173, XP035610464. 163-173. 11 pages.

(Continued)

*Primary Examiner* — Shreyans A Patel

(57) ABSTRACT

A system for detecting speech from reverberant signals is disclosed. The system is programmed to receive spectral temporal amplitude data in the modulation frequency domain. The system is programmed to then enhance the spectral temporal amplitude data by reducing reverberation and other noise as well as smoothing based on certain properties of the spectral temporal spectrogram associated with the spectral temporal amplitude data. Next, the system is programmed to compute various features related to the presence of speech based on the enhanced spectral temporal amplitude data and other data in the modulation frequency (Continued)

domain or in the (acoustic) frequency domain. The system is programmed to then determine an extent of speech present in the audio data corresponding to the received spectral temporal amplitude data based on the various features. The system can be programmed to transmit the extent of speech present to an output device.

20 Claims, 8 Drawing Sheets

(56) References Cited

U.S. PATENT DOCUMENTS

| | | | | |
|---|---|---|---|---|
| 9,520,140 | B2 | 12/2016 | Goesnar | |
| 9,640,185 | B2 | 5/2017 | Kushner | |
| 9,837,102 | B2 | 12/2017 | Zad Issa | |
| 9,842,605 | B2 | 12/2017 | Lu | |
| 10,803,879 | B2 | 10/2020 | Lu | |
| 2009/0192788 | A1 | 7/2009 | Yoshioka | |
| 2012/0070016 | A1 | 3/2012 | Yonekubo | |
| 2014/0126745 | A1 | 5/2014 | Dickins | |
| 2014/0270226 | A1 | 9/2014 | Borgstrom | |
| 2014/0337021 | A1 | 11/2014 | Kim | |
| 2016/0064000 | A1 * | 3/2016 | Mizumoto | G10L 17/02 704/233 |
| 2016/0217809 | A1 | 7/2016 | Kida | |
| 2018/0090158 | A1 | 3/2018 | Jensen | |
| 2020/0184995 | A1 | 6/2020 | Fukuda | |

OTHER PUBLICATIONS

Valin, J.-M. (May 31, 2018). A hybrid DSP/deep learning approach to real-time full-band speech enhancement (arXiv:1709.08243v3) [Computer science]. arXiv. 5 pp.

Vijayanarasimhan, S., Ricco, S., Schmid, C., Sukthankar, R., & Fragkiadaki, K. (Apr. 25, 2017). SfM-Net: Learning of structure and motion from video (arXiv:1704.07804v1) [Computer science, Computer Vision and Pattern Recognition]. arXiv. 9 pp.

Unoki, M., Lu, X., Petrick, R., Morita, S., Akagi, M., & Hoffmann, R. (2011). Voice activity detection in MTF-based power envelope restoration. In Proceedings of INTERSPEECH 2011 (pp. 2609-2612). International Speech Communication Association. https://doi.org/10.21437/Interspeech.2011-667. 4 pages.

* cited by examiner

REVERB AND NOISE ROBUST VOICE ACTIVITY DETECTION BASED ON MODULATION DOMAIN ATTENTION

CROSS-REFERENCE TO RELATED APPLICATIONS

This application is a U.S. National Stage application ander U.S.C. 371 of International Application No. PCT/US2022/040076, filed on Aug. 11, 2022, which claims priority of the following priority applications: International application PCT/CN2021/112265 (reference: D20109WO), filed 12 Aug. 2021, U.S. provisional application 63/239,976 (reference: D20109USP1), filed 2 Sep. 2021 and European application EP 21205203.9, filed 28 Oct. 2021, each of which is incorporated by reference in its entirety.

TECHNICAL FIELD

The present Application relates to voice activity detection. More specifically, example embodiment(s) described below relate to solving the noise and reverberation robustness problem based on modulation domain attention.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Conventionally, it has been difficult for speech enhancement systems, as incorporated in hands-free telephony, video conferencing, or hearing aids, to properly manage noise and reverberation (which can be considered as noise but will be separately referenced hereinafter). It would be helpful to have robust voice activity detection (VAD) that estimates information regarding noise and reverberation and reduces artifacts and perceptual disruption caused by noise and reverberation during speech. Such VAD can be especially helpful for audio/video content recording and playback systems, such as a voice messaging component of any social networking software, a video blog (vlog) platform, or a podcast setup, to enhance speech quality and intelligibility.

SUMMARY

A computer-implemented method of detecting speech from reverberant signals based on data in a modulation frequency domain is disclosed. The method comprises receiving, by a processor, new audio data in a time domain; converting, by the processor, a piece of the new audio data corresponding to a time point into a specific spectral temporal amplitude (STA) as a time-frequency representation; applying a detection model to the specific STA to obtain an estimate of an extent of speech in the new audio data, comprising: obtaining a modulation spectrum measure (MSM) for the time point having an acoustic band dimension and a modulation band dimension from one or more STAs obtained from new audio data; computing a diffuseness indicator (DI) based on the MSM that indicates a degree of diffuseness in a modulation frequency domain for the piece of the new audio data; generating an enhanced STA that filters reverberation and other noise from the specific STA; calculating one or more features from the enhanced STA; creating one or more feature vectors using the DI and the one or more features; and determining an estimate of an extent of speech in the piece of the new audio data from the one or more feature vectors; and transmitting the estimate of the extent of speech in the piece of the new audio data.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENTS

Figure 1:
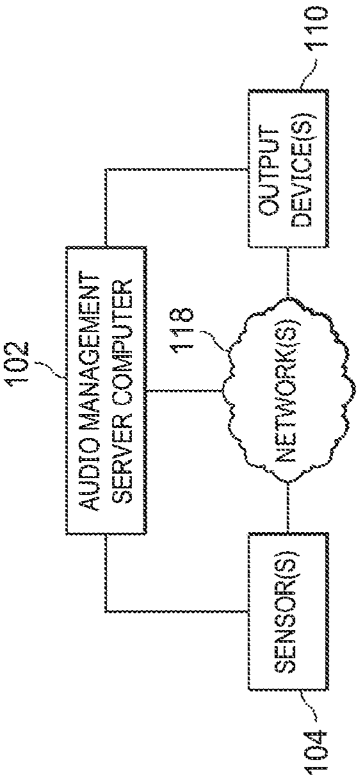
FIG. 1 illustrates an example networked computer system in which various embodiments may be practiced.

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

Embodiments are described in sections below according to the following outline:

1. GENERAL OVERVIEW
2. EXAMPLE COMPUTING ENVIRONMENTS
3. EXAMPLE COMPUTER COMPONENTS
4. FUNCTIONAL DESCRIPTIONS
4.1. DIFFUSENESS INDICATOR MODULE
4.2. SPECTRAL TEMPORAL AMPLITUDE ENHANCER
4.3. ENHANCED FEATURE EXTRACTOR
4.4. FEATURE FUSION AND CLASSIFICATION
5. EXAMPLE PROCESSES
6. HARDWARE IMPLEMENTATION

1. General Overview

A system for detecting speech from reverberant signals based on data in a modulation frequency domain and a related method are disclosed. In some embodiments, the system is programmed to receive spectral temporal amplitude data. The system is programmed to then enhance the spectral temporal amplitude data by reducing reverberation and other noise as well as smoothing based on certain properties in the modulation frequency domain of the spectral temporal spectrogram associated with the spectral temporal amplitude data. Next, the system is programmed to compute various features related to the presence of speech based on the enhanced spectral temporal amplitude data and other data in the modulation frequency domain or in the (acoustic) frequency domain. The system is programmed to then determine an extent of speech present in the audio data corresponding to the received spectral temporal amplitude data based on the various features. The system can be programmed to transmit the extent of speech present to an output device.

In some embodiments, the reduction of reverberation to produce the enhanced spectral temporal amplitude data is mainly based on filtering out information that falls in certain modulation frequency ranges. The computation of features that characterize the reduced presence of reverberation can include applying existing metrics typically applied to the frequency domain to the modulation frequency domain, or include directly extract features from a modulation spectrogram associated with the spectral temporal amplitude.

The system presents technical benefits. The system enables effective VAD by intelligently selecting features from audio data that discriminate between speech and noise, including reverberation. These features can exist at different levels, some relating to the noise in the environment, and some relating to clean speech, to increase the accuracy of the classification using these features. Such VAD further enables the detection and extraction of clean speech from given audio data and have many applications especially in environments where reverberation frequently occurs.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises an audio management server computer 102 ("server"), one or more sensors 104 or input devices, and one or more output devices 110, which are communicatively coupled through direct physical connections or via one or more networks 118.

In some embodiments, the server 102 broadly represents one or more computers, virtual computing instances, and/or instances of an application that is programmed or configured with data structures and/or database records that are arranged to host or execute functions related to low-latency speech enhancement by noise reduction. The server 102 can comprise a server farm, a cloud computing platform, a parallel computer, or any other computing facility with sufficient computing power in data processing, data storage, and network communication for the above-described functions.

In some embodiments, each of the one or more sensors 104 can include a microphone or another digital recording device that converts sounds into electric signals. Each sensor is configured to transmit detected audio data to the server 102. Each sensor may include a processor or may be integrated into a typical client device, such as a desktop computer, laptop computer, tablet computer, smartphone, or wearable device.

In some embodiments, each of the one or more output devices 110 can include a speaker or another digital playing device that converts electrical signals back to sounds. Each output device is programmed to play audio data received from the server 102. Similar to a sensor, an output device may include a processor or may be integrated into a typical client device, such as a desktop computer, laptop computer, tablet computer, smartphone, or wearable device.

The one or more networks 118 may be implemented by any medium or mechanism that provides for the exchange of data between the various elements of FIG. 1. Examples of the networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive input audio data corresponding to sounds in a given environment from the one or more sensors 104. The sever 102 is programmed to next process the input audio data, which typically corresponds to a mixture of speech and noise, to estimate how much speech is present in each frame of the input data. The server 102 is also programed to update the input audio data based on the estimates to produce cleaned-up output audio data expected to contain less noise than the input audio data. Furthermore, the server 102 is programmed to send the output audio data to the one or more output devices.

3. Example Computer Components

Figure 2:
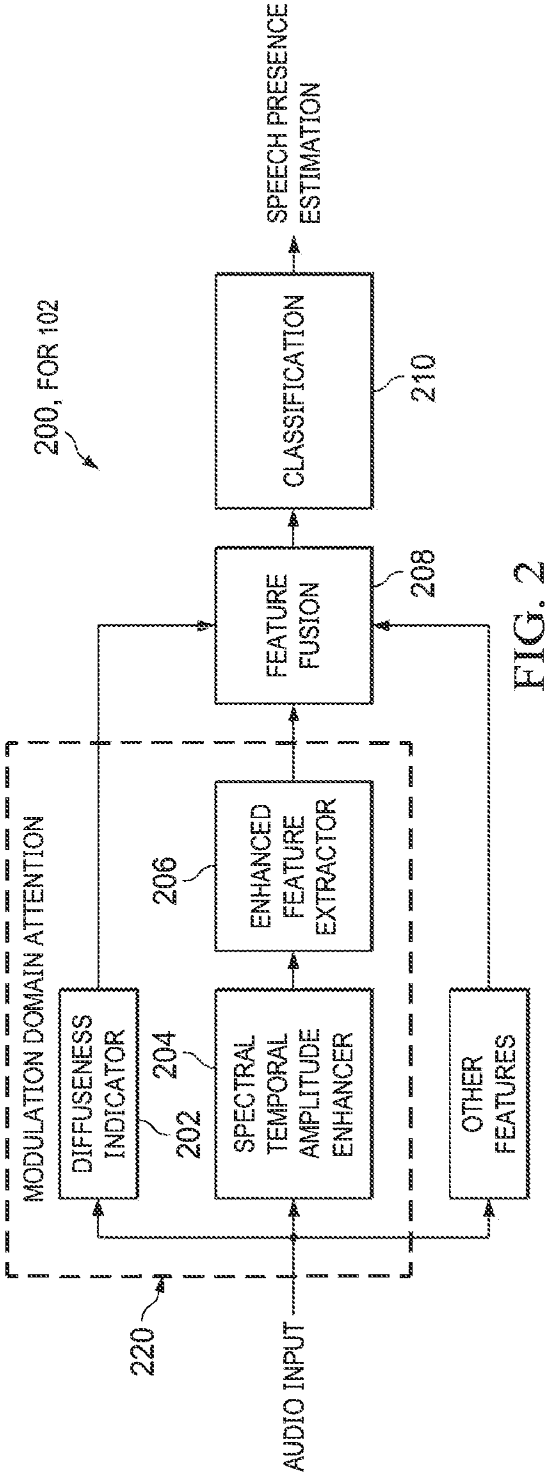
FIG. 2 illustrates example components of an audio management server computer in accordance with the disclosed embodiments.

FIG. 2 illustrates example components of an audio management server computer in accordance with the disclosed embodiments. The figure is for illustration purposes only and the server 102 can comprise fewer or more functional or storage components. Each of the functional components can be implemented as software components, general or specific-purpose hardware components, firmware components, or any combination thereof. Each of the functional components can also be coupled with one or more storage components (not shown). A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 comprises a modulation domain attention module 220, which comprises a diffuseness indicator module 202, a spectral temporal amplitude enhancer 204, and an enhanced feature extractor 206. The server 102 also comprises a feature fusion operator 208, and a classification operator 210.

In some embodiments, the diffuseness indicator module 202 includes computer-executable instructions that enable the generation of discriminative features that discriminate between speech and non-speech (e.g., reverberation or other noise) based on different clustering characteristics in the modulation frequency domain.

In some embodiments, the spectral temporal amplitude enhancer 204 includes computer-executable instructions that enable the enhancement of a spectral temporal amplitude in the modulation frequency domain for enhanced feature extraction.

In some embodiments, the enhanced feature extractor 206 includes computer-executable instructions that enable the extraction of temporal and spectral features from the enhanced spectral temporal amplitude data.

In some embodiments, the feature fusion operator 208 includes computer-executable instructions that enable the combination of the features produced by the diffuseness indicator module 202, enhanced feature extractor 206, and optionally other features, as further discussed below.

In some embodiments, in the classification operator 210 includes computer-executable instructions that enable the determination of the presence of clean speech, without reverberation or other noise, in given audio data, based on the combination of features produced by the feature fusion operator 208.

4. Functional Descriptions

While a mixed audio signal may have a great deal of overlap in the time domain, modulation frequency analysis provides an additional dimension that can present a greater degree of separation among audio sources. In other words, an audio signal initially captured in the time domain can be converted to a time-to-frequency representation (TFR) (a view of a signal as a function of time represented over both time and frequency) through transformations like a discrete Short-Time Fourier Transform (STFT). The TFR can then be augmented to a third dimension that represents modulation frequency with certain assumptions.

The modulation frequency domain is typically shown through a modulation spectrogram, which indicates intensity values within which the vertical axis represents the regular acoustic frequency index k and the horizontal axis represents the modulation frequency index i, as illustrated in FIGS. 3A, 3B, 4A, 4B, 5A, 5B, and 5C. The modulation spectrogram can demonstrate the greater degree of separation among audio sources.

In the modulation frequency domain, clean (anechoic) speech, temporal envelopes contain frequencies ranging from 2-16 Hz with spectral peaks at approximately 4 Hz, which corresponds to the syllabic rate of spoken speech. However, noise and reverberation exhibit different modulation characteristics. With reverberant speech, the diffuse reverberation tail is often modeled as an exponentially damped Gaussian white noise process. With increasing reverberation levels, the signal attains more Gaussian white-noise like properties. Reverberant signals exhibit higher-frequency temporal envelopes due to the "whitening" effect of the reverberation tail.

Figure 3A:
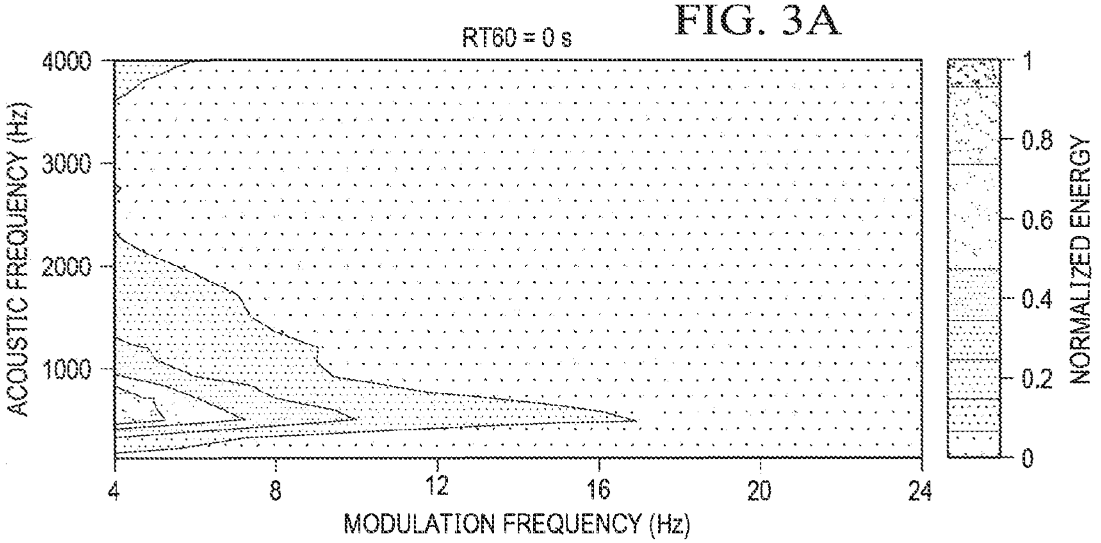
FIG. 3A illustrates an energy plot in a joint acoustic/modulation frequency representation for a clean, reverberant speech signal with a reverberation time 0 ms.
Figure 3B:
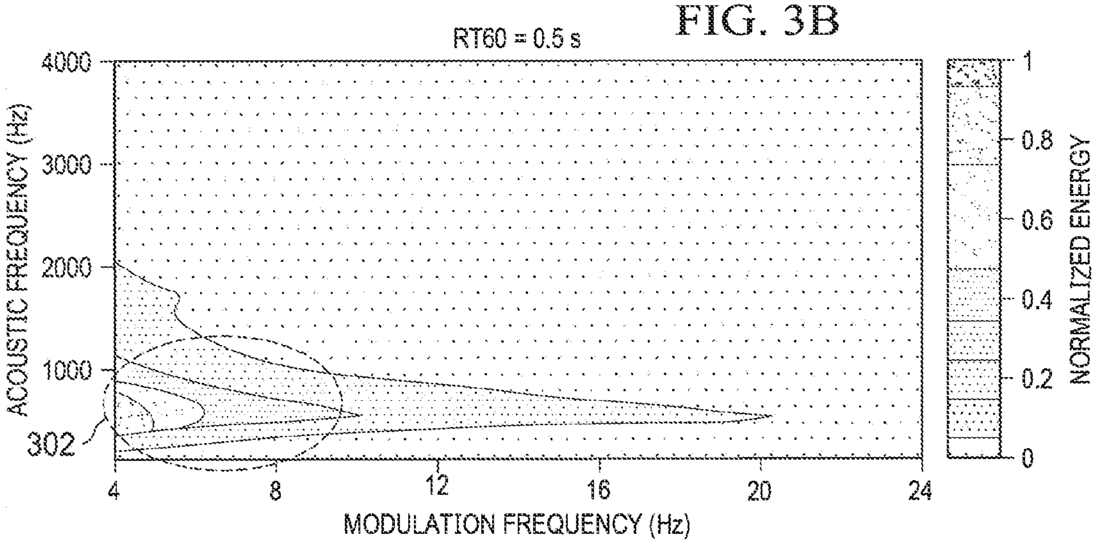
FIG. 3B illustrates an energy plot in a joint acoustic/modulation frequency representation for a clean, reverberant speech signal with a reverberation time 500 ms.
Figure 3C:
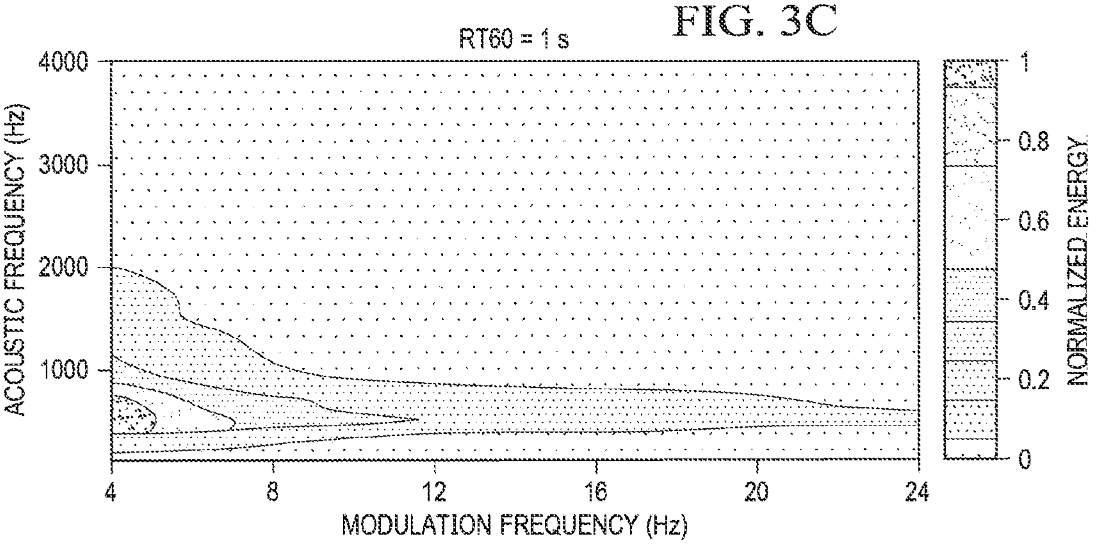
FIG. 3C illustrates an energy plot in a joint acoustic/modulation frequency representation for a reverberant speech signal with a reverberation time 1 second(s).

FIG. 3A illustrates an energy plot in a joint acoustic/modulation frequency representation for a clean, reverberant speech signal with a reverberation time 0 ms. FIG. 3B illustrates an energy plot in a joint acoustic/modulation frequency representation for a clean, reverberant speech signal with a reverberation time 500 ms. FIG. 3C illustrates an energy plot in a joint acoustic/modulation frequency representation for a reverberant speech signal with a reverberation time 1 second(s). As illustrated in FIG. 3B, for clean speech, the bulk of the modulation energy 302 is mainly situated at below 10 Hz in the modulation frequency domain, and peaks at around 4 Hz. As illustrated in FIG. 3C, reverberation causes smearing of the energy into higher modulation frequencies. The stronger the reverberation, the more shifting towards higher modulation frequencies. These figures demonstrate that clean speech, generally resulting in higher energy, is concentrated in the lower modulation frequency region, and that the more reverberation, the more energy shifting into the higher-modulation frequency region.

Since room noise diffusion typically occurs slowly as a function of time, the modulation spectrum of room noise is dominated by modulation frequency below 1 Hz. Thus, the envelope of the room noise can be modeled as a constant plus a random value. The constant envelope covers the main energy and is concentrated below 1 Hz in modulation frequency, and the random envelop covers the residual energy evenly distributed throughout the modulation frequency domain.

Figure 4A:
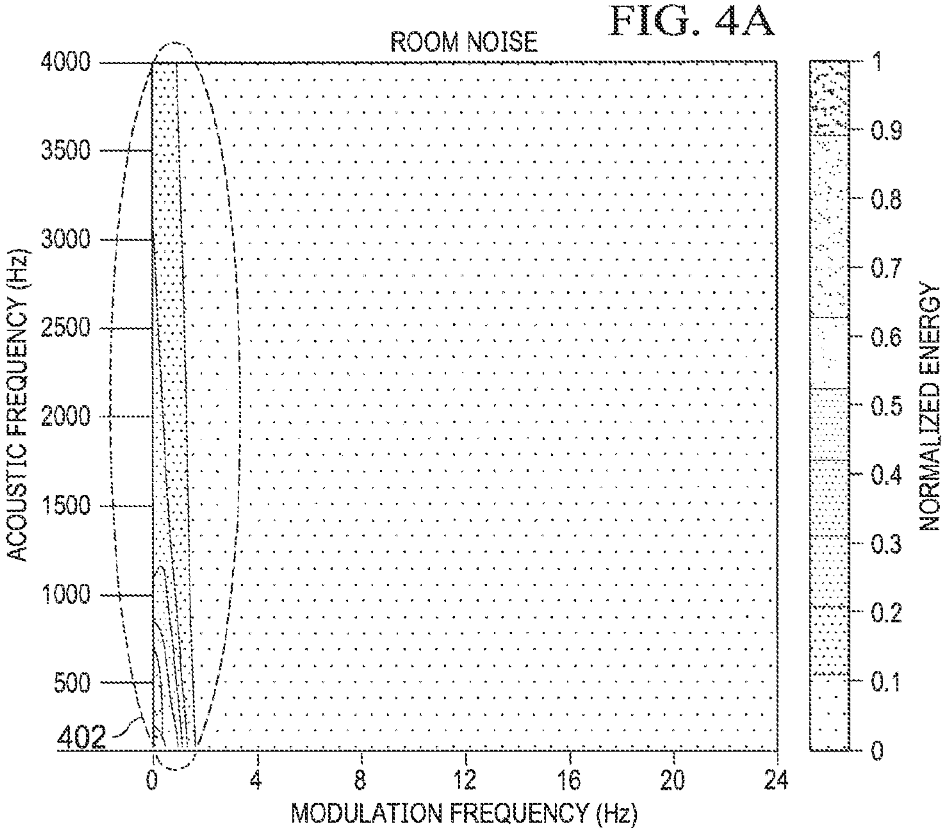
FIG. 4A illustrates an energy plot in a joint acoustic/modulation frequency representation for noise recorded in a room, where modulation frequency ranges up to 24 Hz.
Figure 4B:
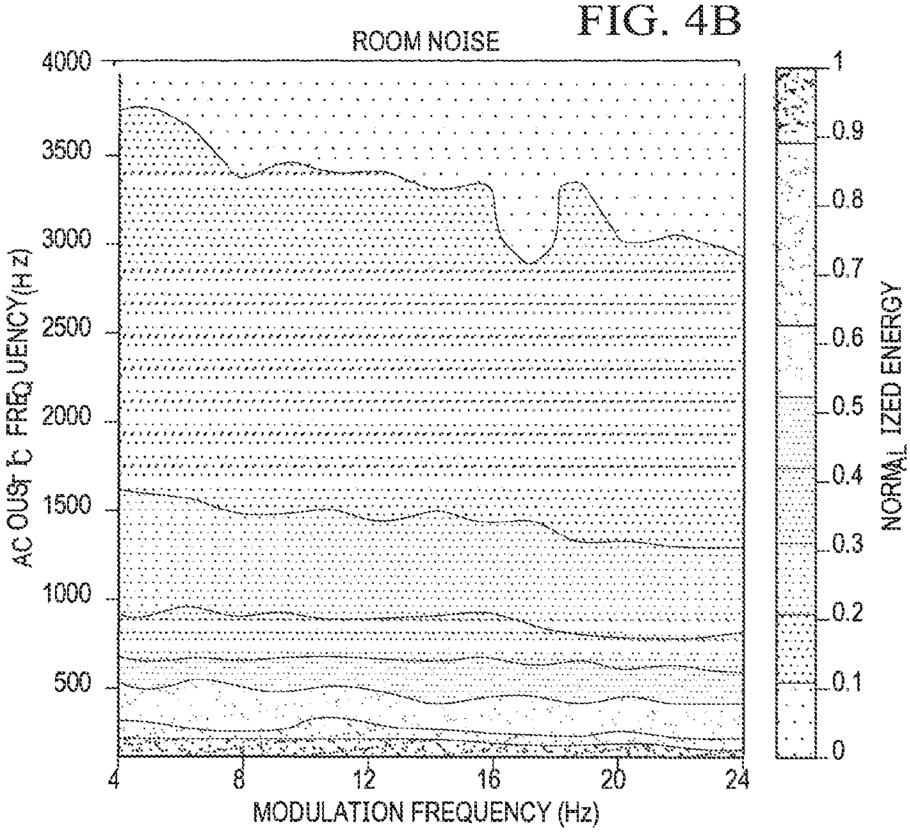
FIG. 4B illustrates an energy plot in a joint acoustic/modulation frequency representation for noise recorded in a room, where the modulation frequency ranges between 4-24 Hz.

FIG. 4A illustrates a normalized energy plot in a joint acoustic/modulation frequency representation for noise recorded in a room (room noise without speech), where the modulation frequency ranges up to 24 Hz and normalization is implemented across 0-24 Hz. As shown in FIG. 4A, the main energy is concentrated below 1 Hz in modulation frequency, which illustrates the constant envelope of the room noise. FIG. 4B illustrates a normalized energy plot in a joint acoustic/modulation frequency representation for noise recorded in a room, where the modulation frequency ranges between 4-24 Hz and the normalization is implemented across 4-24 Hz. As shown in FIG. 4B, the residual random envelope of the room noise exhibits an even distribution along the modulation frequency dimension. Besides, the energy is mainly concentrated at low acoustic frequencies, and gradually decreases as the acoustic frequency increases.

Figure 5A:
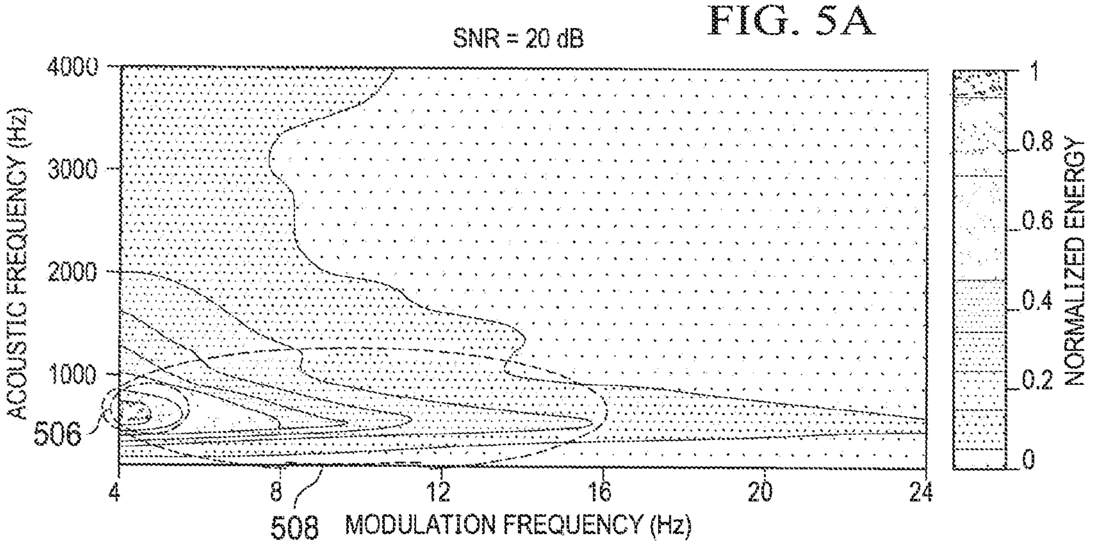
FIG. 5A illustrates an energy plot in a joint acoustic/modulation frequency representation with a signal-to-noise (SNR) ratio of 20 dB.
Figure 5B:
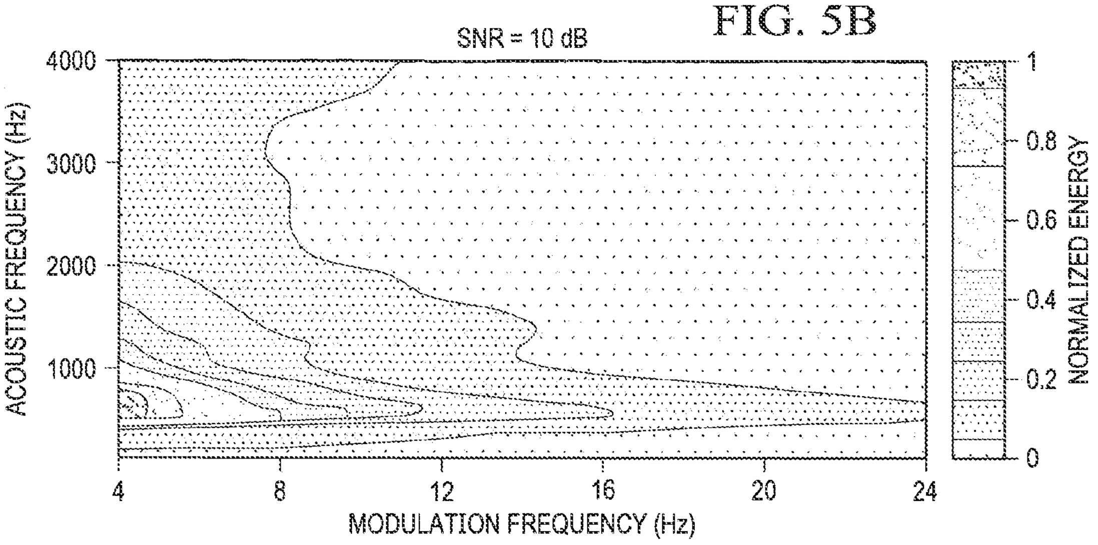
FIG. 5B illustrates an energy plot in a joint acoustic/modulation frequency representation with a signal-to-noise (SNR) ratio of 10 dB.
Figure 5C:
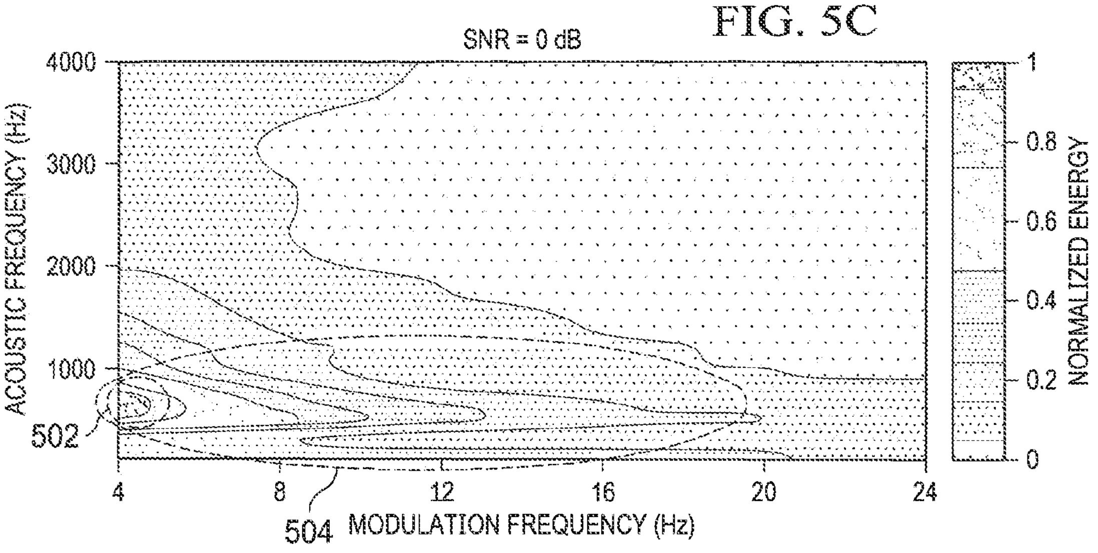
FIG. 5C illustrates an energy plot in a joint acoustic/modulation frequency representation with a signal-to-noise (SNR) ratio of 0 dB.

FIG. 5A illustrates an energy plot in a joint acoustic/modulation frequency representation with a signal-to-noise (SNR) ratio of 20 dB. FIG. 5B illustrates an energy plot in a joint acoustic/modulation frequency representation with a signal-to-noise (SNR) ratio of 10 dB. FIG. 5C illustrates an energy plot in a joint acoustic/modulation frequency representation with a signal-to-noise (SNR) ratio of 0 dB. The noise here is real recorded room noise. As can be seen in these figures, when the modulation frequency is above 4 Hz, the constant temporal envelopes of room noise (below 4 Hz), as illustrated in FIG. 4A, have been filtered or masked and the remaining random temporal envelopes of noise, as illustrated in FIG. 4B, cause relatively evenly masking of the speech area especially in the low acoustic frequency band. The stronger the noise, the more masking in the modulation frequency domain, as seen from the smaller proportion of the high-energy part, such as 502, out of most the parts in the same acoustic frequency range, such as 504 in FIG. 5C, compared with portion of the high-energy part, such as 506, out of most the parts in the same acoustic frequency range. Therefore, most energies exist in a low acoustic frequency range. In addition, clean speech, generally resulting in higher energy, is concentrated in the lower modulation frequency region, and that the more "noise", the more blending or masking of random temporal envelopes that take energies into the higher modulation frequency region.

In some embodiments, the server 102 receives a time domain signal x(n), for which n represents a discrete-time dependent variable. The time-frequency (T-F) transform X(l, k) of x(n) can be obtained using the STFT.

$$X(l,k)=\sum_{n=0}^{N-1}x(n)g(lM-n)e^{-j2\pi nk/N}$$

where l denotes the time/frame index, k denotes the channel index, N represents the frame length or the Fast Fourier Transformation (FFT) length, g(·) represents the analysis window with a length N, and M represents the decimated factor.

In some embodiments, the server 102 then transforms X(l, k), which is a T-F transformed narrowband signal, into the spectral temporal amplitude of perceptual acoustic bands Y(l, m) based on the human auditory system using a transform matrix:

$$Y(l,m)=\sqrt{H\cdot|X(l,0:N/2)|^2}$$

where m denotes the index of a perceptual acoustic band, H is $$\left(\frac{N}{2}+1\right)\times\left(\frac{N}{2}+1\right)$$

matrix designed for banding, and $$X\left(l,0:\frac{N}{2}\right)$$

denotes X(l, k) where k ranges over 0 through $$\frac{N}{2}.$$

Only first $$\frac{N}{2}+1$$

narrow bands of X(l, K) are used because the residual narrow bands can be recovered by the first $$\frac{N}{2}+1FFT$$

components for real-valued signals.

In some embodiments, the modulation spectrum measure (spectrogram) Z(l, m, c) at any frame l, perceptual acoustic band m, and modulation band c is computed using the last L frames of spectral amplitude base on FFT:

$$Z(l,m,c)=\sum_{n=l-L+1}^{l}Y(n,m)\omega(l-n)e^{-j2\pi(n+L-1)c/L}\tag{1}$$

where ω(·) denotes a window function known to someone skilled in the art.

4.1. Diffuseness Indicator Module

In some embodiments, the server 102 in the Diffuseness Module 202 Computes the diffuseness indicator (DI) for a particular time based on the last L frames that characterizes the relationship between the energies that fall in the lower range of the modulation frequency domain and the energies that fall in the higher range of the modulation frequency domain. As discussed above, the energy data corresponding to clean speech tends to fall in a lower range in the modulation frequency domain, but the more reverberation or other noise that is mixed with the clean speech, the energy data corresponding to the mix tends to extend to higher ranges in the modulation frequency domain, resulting in more "diffusion" of energy values in the modulation frequency domain. Therefore, a higher DI would indicate a more reverberant or otherwise noisy audio signal.

In some embodiments, the DI can be computed as the center of gravity of the modulation spectrum:

$$DI(l)=\frac{\sum_{c=c_L}^{c_H}(c-1)\sum_{m=m_L}^{m_H}|Z(l,m,c)|^2}{\sum_{c=c_L}^{c_H}\sum_{m=m_L}^{m_H}|Z(l,m,c)|^2}\tag{2}$$

where $c_L$ and $c_H$ indicate the lowest and highest modulation-bands in the analysis that typically correspond to 3 and 30 Hz, and $m_L$ and $m_H$ indicate the lowest and highest acoustic-bands in the analysis and typically correspond to 125 Hz and 8,000 Hz.

In some embodiments, the DI can be computed as the energy ratio of the low modulation part and the high modulation part:

$$DI(l)=\frac{\sum_{c=c_{L1}}^{c_{L2}}\sum_{m=m_L}^{m_H}|Z(l,m,c)|^2}{\sum_{c=c_{H1}}^{c_{H2}}\sum_{m=m_L}^{m_H}|Z(l,m,c)|^2}\tag{3}$$

where $c_{L1}$ and $c_{L2}$ indicate the modulation-bands that typically correspond to 3 and 16 Hz, and $c_{H1}$ and $c_{H2}$ indicate the modulation-bands that typically correspond to 16 and 30 Hz.

In some embodiments, the diffuseness indicator can be computed as the energy ratio of the low modulation part and the whole modulation part:

$$DI(l)=\frac{\sum_{c=c_{L1}}^{c_{L2}}\sum_{m=m_L}^{m_H}|Z(l,m,c)|^2}{\sum_{c=c_{L1}}^{c_{H2}}\sum_{m=m_L}^{m_H}|Z(l,m,c)|^2}\tag{4}$$

4.2. Spectral Temporal Amplitude Enhancer

Figure 6:
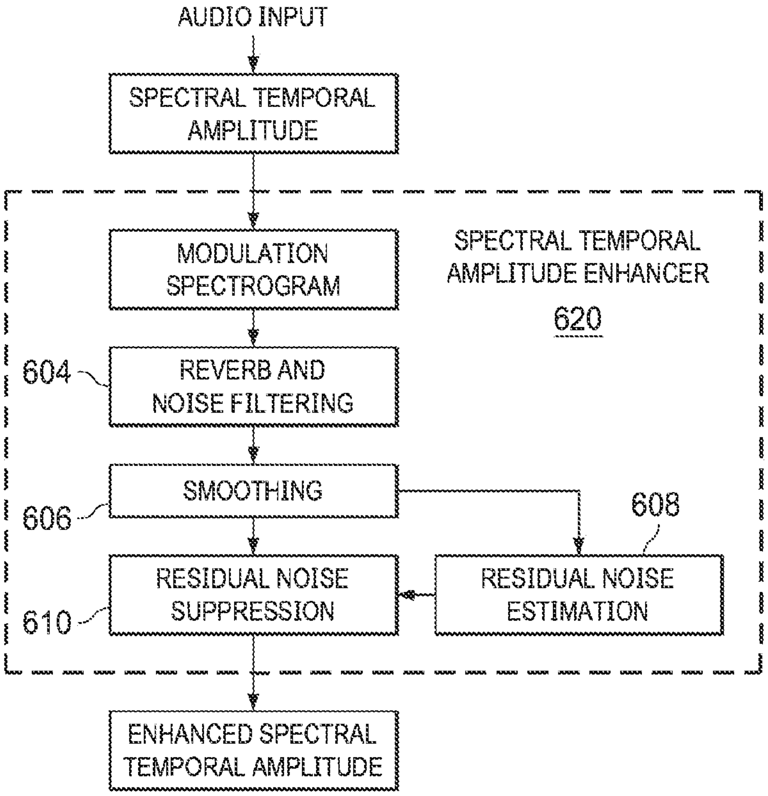
FIG. 6 illustrates a process of enhancing temporal spectral magnitude data with noise reduction performed by audio management server computer in a spectral temporal amplitude enhancer.

FIG. 6 illustrates a process of enhancing spectral temporal amplitude data with noise reduction performed by the server in the spectral temporal amplitude enhancer. In some embodiments, the server 102 in the spectral temporal amplitude enhancer 204 performs a series of steps, including reverberation and noise filtering, residual noise estimation, and residual noise suppression in the modulation frequency domain, to convert the initial spectral temporal amplitude data to enhanced spectral temporal amplitude data.

In some embodiments, given a modulation spectrum measure as computed from formula (1), the server 102 in box 604 filters noise and reverberation to obtain a filtered modulation spectrum measure Ź (l, m, c) as follows:

$$\hat{Z}(l,m,c)=\begin{cases} Z(l,m,c), c_L \le c \le c_H \\ 0, \text{otherwise} \end{cases} \tag{5}$$

where $c_L$ is the index of the low cutoff modulation band and $c_H$ is the index of the high cutoff modulation band, as noted for formula (2).

In some embodiments, the server 102 in box 606 smooths the filtered modulation spectrum measure as follows. According to Parseval's theorem, which loosely indicates that the sum (or integral) of the square of a function is equal to the sum (or integral) of the square of its Fourier transform.:

$$E(l,m)=\sum_{n=0}^{L-1}|Y(n,m)|^2=\frac{1}{L}\sum_{c=0}^{L-1}\left|\hat{Z}(l,m,c)\right|^2 \tag{6}$$

where $|Y(n, m)|^2$ is proportional to the spectral temporal energy corresponding to the amplitude Y(n, m).

The server 102 computes the smoothed spectral temporal energy in the modulation frequency domain $\overline{Y}^2$ (l, m) by aggregation as follows:

$$\overline{Y}^2(l,m)=\frac{E(l,m)}{L} \tag{7}$$

which represents the average of $|Y(n, m)|^2$ referred to in formula (6).

Now, the server 102 computes the enhanced spectral temporal energy Ê (l, m) with reverberation and noise filtering in the modulation frequency domain based on formulas (5) and (6) above as follows:

$$\hat{E}(l,m)=\frac{1}{L}\sum_{c=c_L}^{c_H}\left|\hat{Z}(l,m,c)\right|^2 \tag{8}$$

The server 102 can then compute the smoothed and enhanced spectral temporal amplitude $\acute{Y}_{rs}$ (l, m) based on formula (7) above as follows:

$$\hat{Y}_{rs}(l,m)=\sqrt{2\hat{E}(l,m)/L} \tag{9}$$

where the constant 2 is used to keep the energy unscaled because of the conjugate symmetry of FFT.

In some embodiments, the server 102 in box 608 estimates the spectral temporal amplitude of residual (ambient) noise $\hat{N}_{oise}$ (l, m). One approach is for the server 102 to track the minimum level of spectral temporal energy in a room over a period of time.

In some embodiments, the server 102 in box 610 performs residual noise estimation and suppression to obtained the enhanced spectral temporal amplitude Ý (l,m) as output data of the box 620 as follow:

$$\hat{Y}(l,m)=\max\left(\hat{Y}_{rs}(l,m)-\hat{N}_{oise}(l,m),0\right) \tag{10}$$

In some embodiments, data in the modulation frequency domain can be used to compute the enhanced spectral temporal amplitude via a machine learning model. To build the model, an "original speech" class comprising pieces of spectral temporal amplitude data in the modulation frequency domain that corresponds to a combination of clean speech, noise, and reverb of a length of a certain range of lengths, such as 5 minutes, can be included in the training dataset as input data. An "enhanced speech" class comprising pieces of spectral temporal amplitude data in the modulation frequency domain that corresponds to smoothed, noise-reduced clean speech can be included in a training dataset as output data. As discussed above, the noise reduction includes eliminating reverberation, ambient sound, and other noise. Machine learning methods known to someone skilled in the art, such as the ones described in arXiv: 1709.08243 or arXiv: 1704.07804 [cs.CV], could then be applied to the training data set to build the model configured to produce enhanced spectral temporal amplitude data. Then the feature extractor can extract features based on the enhanced spectral temporal amplitude instead of the original amplitude to derive the enhanced features, as discussed below.

4.3. Enhanced Feature Extractor

In some embodiments, the server 102 in the enhanced feature extractor 206 calculates certain features of the enhanced temporal spectral amplitude, such as the enhanced mel-frequency cepstral coefficients (MFCC) or an enhanced spectral flatness (SFT) normally applied to frequency spectrums.

In some embodiments, the server 102 computes the enhanced MFCC (EMFCC) using the enhanced temporal spectral amplitude calculated in the spectral temporal amplitude enhancer 204, instead of the original spectral temporal amplitude, in the computation of the MFCC. The mel-frequency filter can be treated as a specific banding matrix before computing the MFCC.

In some embodiments, the server 102 computes the enhanced SFT (ESFT) using the enhanced spectral temporal amplitude calculated in the spectral temporal amplitude enhancer 204, instead of the original spectral temporal amplitude, in the computation of the SFT. Specifically, the original SFT can be calculated as follows using Y(l, m) to account for the time dimension:

$$SFT(l)=\frac{\exp\left(\frac{1}{M}\sum_{m=1}^{M}\log(Y(l,m))\right)}{\frac{1}{M}\sum_{m=1}^{M}Y(l,m)} \tag{11}$$

where Y(l, m) again denotes the spectral temporal amplitude of perceptual acoustic-band m for timestamp/or the $l^{th}$ frame, M denotes the total number of the frequency bands, and a summation is taken along the time dimension. The ESFT is derived from the enhanced spectral temporal amplitude Ý (l, m) as follows:

$$ESFT(l)=\frac{\exp\left(\frac{1}{M}\sum_{m=1}^{M}\log\left(\hat{Y}(l,m)\right)\right)}{\frac{1}{M}\sum_{m=1}^{M}\hat{Y}(l,m)} \tag{12}$$

In some embodiments, other spectral-related measures can also be used to characterize the flat or peak condition of a signal spectrum and produce additional features of the enhanced spectral temporal amplitude, such as the following:

Spectral crest based on the sum of the peak bands to other bands power ratio;

Spectral crest based on peak to average (without peak band) power ratio;

Variance or standard deviation of adjacent spectral band power;

Sum or maximum of spectral band power difference among adjacent frequency band;

Spectral Spread or spectral variance around its spectral centroid;

Spectral entropy.

4.4. Feature Fusion and Classification

In some embodiments, the server 102 in the feature fusion operator 208 combines the diffuseness indicator, enhanced features, and other commonly used features without enhancement, such zero-crossing rate, spectral flux, or pitch in the frequency domain. The server 102 then computes one or more feature vectors from the combination. The output of all the features could be simply concatenated into one feature to form a vector of one feature. Different features could also form a vector of multiple features. Alternatively, different features could form respective feature vectors, each vector having one feature.

In some embodiments, the server 102 in the classification operator 210 classifies the one or more feature vectors produced by the feature fusion operator 208 via a machine learning model. The build the model, the server 102 can prepare a training set of feature vectors produced by running a set audio signals (converted into the frequency domain and the modulation frequency domain) that contain and various extents of speech (excluding reverberation or other noise) and various extents of reverberation through the modules 202, 204, 206, and 208. The "extent" can be defined as a proportion in terms of volume or loudness, namely the amplitude of the sound wave, or in terms of another sound characteristic. For each signal in the training set, the extracted feature vectors could be the input data, and an indication of the presence of any speech in the signal (a binary value) or an extent of clean speech in the signal (a continuous value) could be the output data. The server 102 can then apply any machine learning model known to someone skilled in the art for classification, such as logistical regression, statistical methods, including adaptive boosting (AdaBoost) or a Gaussian mixture model (GMM), or artificial neural networks, including a multilayer perceptron or a support vector machine. For example, for a neural network, a softmax function can be applied to compute a probability that the input signal contains speech, which could be used as an estimate of the extent of speech in the input signal.

5. Example Processes

Figure 7:
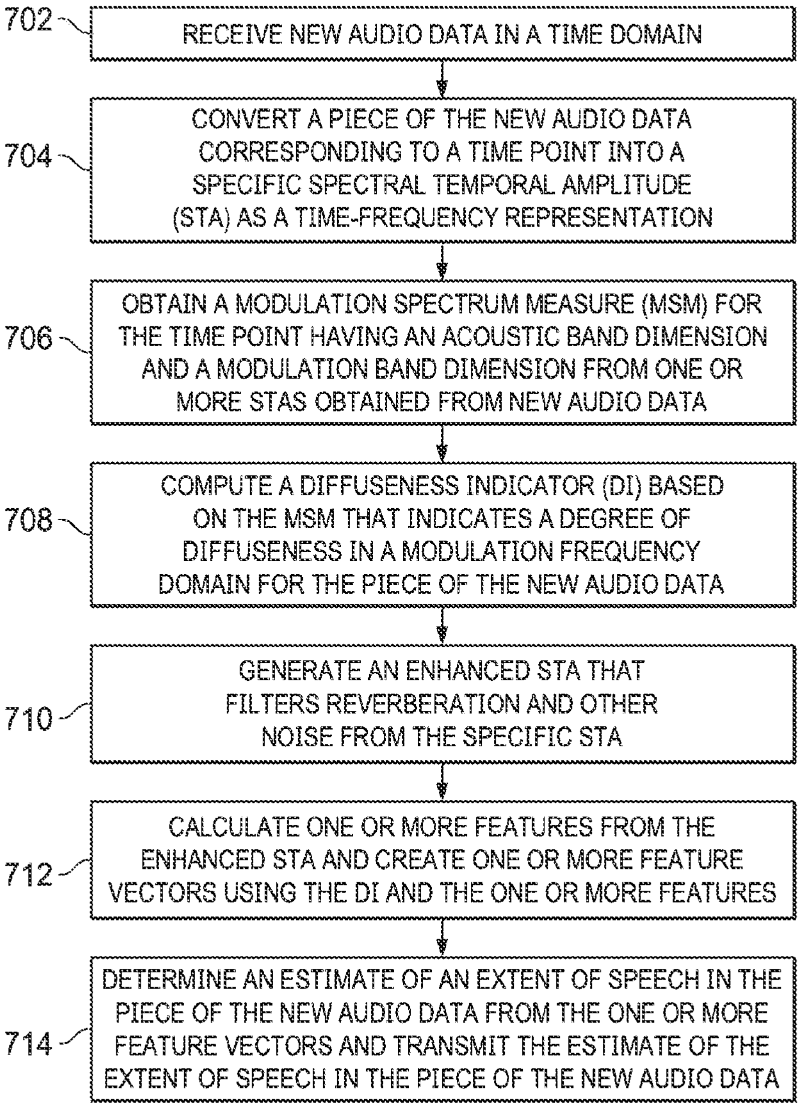
FIG. 7 illustrates an example process performed with an audio management server computer in accordance with some embodiments described herein.

FIG. 7 illustrates an example process performed with an audio management server computer in accordance with some embodiments described herein. FIG. 7 is shown in simplified, schematic format for purposes of illustrating a clear example and other embodiments may include more, fewer, or different elements connected in various manners. FIG. 7 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 702, the server 102 is programmed to receive new audio data in a time domain.

In some embodiments, in step 704, the server 102 is programmed to convert a piece of the new audio data corresponding to a time point into a specific spectral temporal amplitude (STA) as a time-frequency representation.

In some embodiments, in step 706, the server 102 is programmed to obtain a modulation spectrum measure (MSM) for the time point having an acoustic band dimension and a modulation band dimension from one or more STAs obtained from new audio data.

In some embodiments, in step 708, the server 102 is programmed to compute a diffuseness indicator (DI) based on the MSM that indicates a degree of diffuseness in a modulation frequency domain for the piece of the new audio data.

In some embodiments, the DI is a center of gravity of a modulation spectrum based on values of the MSM in a range of modulation frequency bands and a range of acoustic frequency bands. In other embodiments, the DI is an energy ratio of a low modulation part based on values of the MSM in a low range of modulation frequency bands and a range of acoustic frequency bands and a high modulation part based on values of the MSM in a high range of modulation frequency bands and the range of acoustic frequency bands. In other embodiments, the DI is an energy ratio of a low modulation part based on values of the MSM in a low range of modulation frequency bands and a range of acoustic frequency bands and an entire modulation part based on values of the MSM in a full range of modulation frequency bands and the range of acoustic frequency bands.

In some embodiments, computing the DI comprises applying a machine learning model trained with measures of the MSM for audio data having only clean speech and audio data having varying degrees of reverberation and other noise as input data and with corresponding DI values as output data.

In some embodiments, in step 710, the server 102 is programmed to generate an enhanced STA that filters reverberation and other noise from the specific STA.

In some embodiments, generating the enhanced STA comprises filtering out values of the MSM outside a range of modulation frequency bands. In other embodiments, the range of modulation frequency bands ranges from 3 Hz to 30 Hz.

In some embodiments, generating the enhanced STA comprises computing a smoothed spectral temporal energy through aggregation over time. In other embodiments, generating the enhanced STA comprising eliminating residual noise through tracking a minimum spectral temporal energy over time.

In some embodiments, generating an enhanced STA comprises applying a machine learning model trained with spectral temporal amplitude data corresponding to varying degrees of reverberation and other noise as input data and corresponding spectral temporal amplitude data corresponding to only clean speech as output data. In other embodiments, the server 102 is further programmed to extract, from application of the machine learning model, features that characterize the clean speech, including a low cutoff modulation frequency and a high cutoff modulation frequency.

In some embodiments, in step 712, the server 102 is programmed to calculate one or more features from the enhanced STA and create one or more feature vectors using the DI and the one or more features.

In some embodiments, the calculating comprises computing an enhanced mel-frequency filter cepstral coefficient (MFCC) through applying a mel-frequency filter to the enhanced STA for use in a last step of computing the MFCC. In other embodiments, the calculating comprises computing an enhanced spectral flatness (SFT) through using the enhanced STA instead of the STA and summing over time values in a computation of the SFT.

In some embodiments, the one or more features include a spectral crest based on a sum of peak bands to other bands power ratio, a spectral crest based on peak to average (without peak band) power ratio, a variance or standard deviation of adjacent spectral band power, a sum or maximum of spectral band power difference among adjacent frequency bands, a spectral Spread or spectral variance around a spectral centroid, and a spectral entropy.

In some embodiments, in step 714, the server 102 is programmed to determine an estimate of an extent of speech in the piece of the new audio data from the one or more feature vectors and transmit the estimate of the extent of speech in the piece of the new audio data.

In some embodiments, the determining comprises applying a machine learning model trained with one or more features of spectral temporal amplitude data corresponding to clean speech and of spectral temporal amplitude data corresponding to varying degrees of reverberation and other noise as input data and with corresponding extents of speech as output data.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
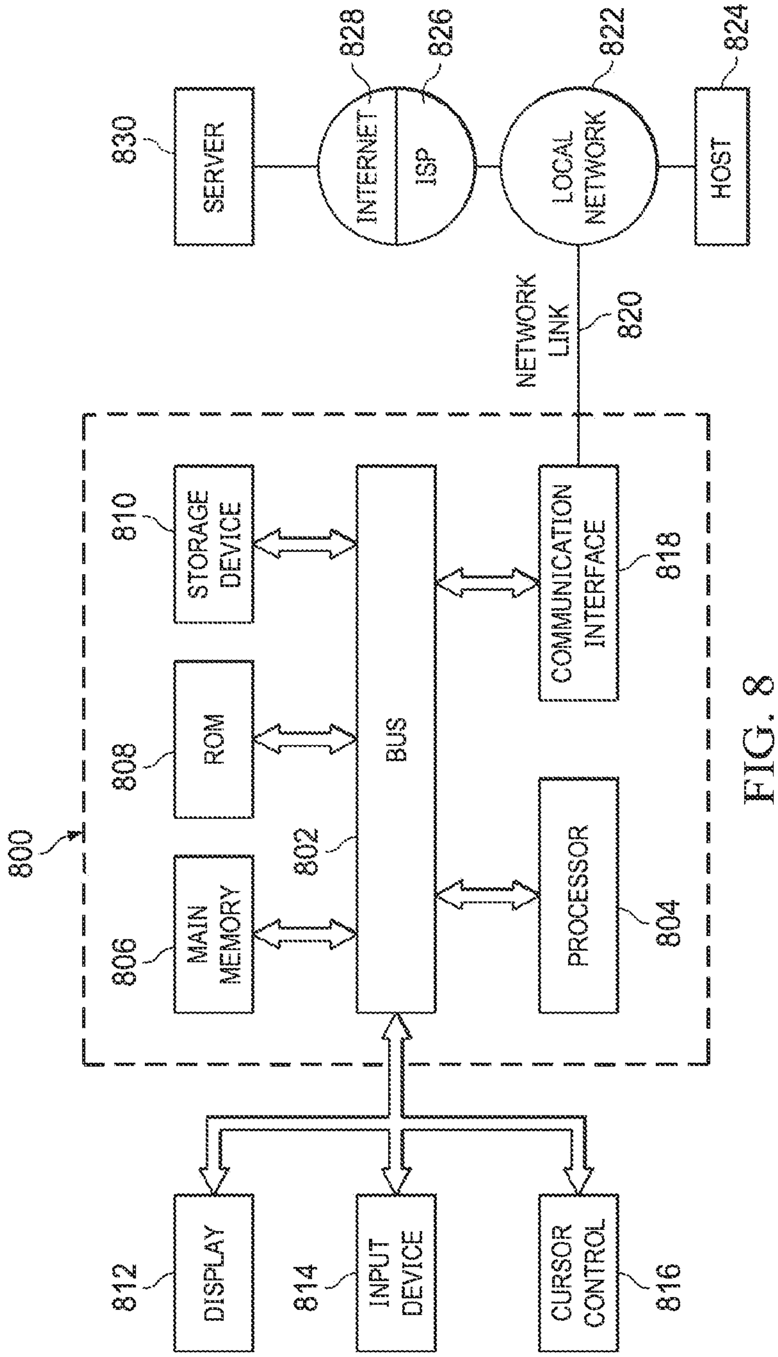
FIG. 8 is a block diagram that illustrates a computer system upon which an embodiment of the invention may be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM, and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or NoSQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

Various aspects of the present invention may be appreciated from the following enumerated example embodiments (EEEs):

EEE1. A computer-implemented method of detecting speech from reverberant signals based on data in a modulation frequency domain, comprising:

obtaining, by a processor, a specific spectral temporal amplitude (STA) as a time-frequency representation corresponding to a time point covered by new audio data in a time domain;

obtaining a modulation spectrum measure (MSM) for the time point having an acoustic band dimension and a modulation band dimension from one or more STAs obtained from new audio data;

computing a diffuseness indicator (DI) based on the MSM that indicates a degree of diffuseness in a modulation frequency domain for the piece of the new audio data;

generating an enhanced STA that filters reverberation and other noise from the specific STA;

calculating one or more features from the enhanced STA;

creating one or more feature vectors using the DI and the one or more features; and determining an estimate of an extent of speech in the piece of the new audio data from the one or more feature vectors;

outputting the estimate of the extent of speech in the piece of the new audio data.

EEE2. The computer-implemented method of EEE 1, the DI being a center of gravity of a modulation spectrum based on values of the MSM in a range of modulation frequency bands and a range of acoustic frequency bands.

EEE3. The computer-implemented method of EEE 1, the DI being an energy ratio of a low modulation part based on values of the MSM in a low range of modulation frequency bands and a range of acoustic frequency bands and a high modulation part based on values of the MSM in a high range of modulation frequency bands and the range of acoustic frequency bands.

EEE4. The computer-implemented method of EEE 1, the DI being an energy ratio of a low modulation part based on values of the MSM in a low range of modulation frequency bands and a range of acoustic frequency bands and an entire modulation part based on values of the MSM in a full range of modulation frequency bands and the range of acoustic frequency bands.

EEE5. The computer-implemented method of EEE 1, the obtaining comprising computing the MSM using pieces of new audio data corresponding to a certain number of consecutive time points before the time point with fast Fourier transform.

EEE6. The computer-implemented method of any of EEEs 1-5, generating the enhanced STA comprising filtering out values of the MSM outside an excluded range of modulation frequency bands.

EEE7. The computer-implemented method of EEE 6, the excluded range of modulation frequency bands being from 3 Hz to 30 Hz.

EEE8. The computer-implemented method of any of EEEs 1-7, generating the enhanced STA comprising computing a smoothed spectral temporal energy through aggregation over time.

EEE9. The computer-implemented method of any of EEEs 1-8, generating the enhanced STA comprising eliminating residual noise through tracking a minimum spectral temporal energy over time.

EEE10. The computer-implemented method of any of EEEs 1-7, generating an enhanced STA comprising applying a machine learning model trained with spectral temporal amplitude data corresponding to varying degrees of reverberation and other noise as input data and corresponding spectral temporal amplitude data corresponding to only clean speech as output data.

EEE11. The computer-implemented method of EEE 10, further comprising extracting, from application of the machine learning model, features that characterize the clean speech, including a low cutoff modulation frequency and a high cutoff modulation frequency.

EEE12. The computer-implemented method of any of EEEs 1-11, the calculating comprising computing an enhanced mel-frequency filter cepstral coefficient (MFCC) using the enhance STA.

EEE13. The computer-implemented method of any of EEEs 1-12, the calculating comprising computing an enhanced spectral flatness (SFT) through using the enhanced STA instead of the STA and summing over time values in a computation of the SFT.

EEE14. The computer-implemented method of any of EEEs 1-13, the one or more features including a spectral crest based on a sum of peak bands to other bands power ratio, a spectral crest based on peak to average (without peak band) power ratio, a variance or standard deviation of adjacent spectral band power, a sum or maximum of spectral band power difference among adjacent frequency bands, a spectral Spread or spectral variance around a spectral centroid, and a spectral entropy.

EEE15. The computer-implemented method of any of EEEs 1-14, the determining comprising applying a machine learning model trained with one or more features of spectral temporal amplitude data corresponding to clean speech and of spectral temporal amplitude data corresponding to varying degrees of reverberation and other noise as input data and with corresponding extents of speech as output data.

EEE16. The computer-implemented method of any of EEEs 1-15, further comprising: receiving new audio data in a time domain;

converting a piece of the new audio data corresponding to a time point into the specific spectral temporal amplitude (STA) as a time-frequency representation.

EEE17. A computer-implemented method of detecting speech from reverberant signals based on data in a modulation frequency domain, comprising:

receiving, by a processor, new audio data in a time domain;

converting, by the processor, a piece of the new audio data corresponding to a time point into a specific spectral temporal amplitude (STA) as a time-frequency representation;

applying a detection model to the specific STA to obtain an estimate of an extent of speech in the new audio data, comprising:

obtaining, by the processor, a modulation spectrum measure (MSM) for the time point having an acoustic band dimension and a modulation band dimension from one or more STAs obtained from new audio data;

computing a diffuseness indicator (DI) based on the MSM that indicates a degree of diffuseness in a modulation frequency domain for a piece of the new audio data corresponding to the time point;

generating an enhanced STA that filters reverberation and other noise from the specific STA;

calculating one or more features from the enhanced STA;

creating one or more feature vectors using the DI and the one or more features;

determining an estimate of an extent of speech in the piece of the new audio data from the one or more feature vectors;

transmitting the estimate of the extent of speech in the piece of the new audio data.

EEE18. The computer-implemented method of EEE 17, the obtaining comprising computing the MSM using pieces of new audio data corresponding to a certain number of consecutive time points before the time point with fast Fourier transform.

EEE19. The computer-implemented method of EEE 17, the generating being based on the Parseval's theorem.

EEE20. The computer-implemented method of EEE 17, the computing comprising using values of the MSM with a range of acoustic frequency bands from 125 Hz to 8,000 Hz.

The invention claimed is:

1. An audio method for producing an enhanced piece of audio data based on data in a modulation frequency domain, the audio method comprising:

receiving, from an input device, a piece of new audio data representing an input audio signal;

obtaining, by a processor, a specific spectral temporal amplitude (STA) as a time-frequency representation corresponding to a time point covered by the new audio data in a time domain;

obtaining a modulation spectrum measure (MSM) for the time point having an acoustic band dimension and a modulation band dimension from one or more STAs obtained from the new audio data;

computing, based on the MSM, a diffuseness indicator (DI) that indicates a degree of diffuseness in a modulation frequency domain for the piece of the new audio data, wherein the DI is computed as:

a center of gravity of a modulation spectrum based on values of the MSM in a range of modulation frequency bands and a range of acoustic frequency bands, or an energy ratio of a low modulation part based on values of the MSM in a low range of modulation frequency bands and a range of acoustic frequency bands and a high modulation part based on values of the MSM in a high range of modulation frequency bands and the range of acoustic frequency bands, or an energy ratio of a low modulation part based on values of the MSM in a low range of modulation frequency bands and a range of acoustic frequency bands and an entire modulation part based on values of the MSM in a full range of modulation frequency bands and the range of acoustic frequency bands;

generating an enhanced STA that filters reverberation and other noise from the specific STA;

calculating one or more features from the enhanced STA;

creating one or more feature vectors using the DI and the one or more features;

determining an estimate of an extent of speech in the piece of the new audio data based on the one or more feature vectors;

updating the piece of the new audio data based on the estimate of the extent of speech to produce the enhanced piece of audio data representing an output audio signal that is less reverberant or noisy than the input audio signal; and transmitting the enhanced piece of audio data to an output device.

2. The audio method of claim 1, wherein the obtaining comprises computing the MSM using pieces of new audio data corresponding to a certain number of consecutive time points before the time point with fast Fourier transform.

3. The audio method claim 1, wherein generating the enhanced STA comprises filtering out values of the MSM outside an excluded range of modulation frequency bands.

4. The audio method of claim 3, wherein the excluded range of modulation frequency bands is from 3 Hz to 30 Hz.

5. The audio method of claim 1, wherein generating the enhanced STA comprises computing a smoothed spectral temporal energy through aggregation over time.

6. The audio method of claim 1, wherein generating the enhanced STA comprises eliminating residual noise through tracking a minimum spectral temporal energy over time.

7. The audio method of claim 1, wherein the calculating comprises computing an enhanced mel-frequency filter cepstral coefficient (MFCC) using the enhanced STA.

8. The audio method of claim 1, further comprising:

receiving the new audio data in a time domain; and converting the piece of the new audio data corresponding to the time point into the specific spectral temporal amplitude (STA) as a time-frequency representation.

9. The audio method of claim 1, wherein the generating is based on the Parseval's theorem.

10. The audio method of claim 1, wherein the computing comprises using values of the MSM with a range of acoustic frequency bands from 125 Hz to 8,000 Hz.

11. The audio method of claim 1, wherein the input device is configured to convert sounds into electrical signals; and wherein the output device is configured to convert electrical signals into sounds.

12. A system, comprising:

at least one processor; and at least one memory including program code, wherein the at least one memory and the program code are configured to, with the at least one processor, cause the system at least to perform the audio method of claim 1.

13. A non-transitory computer-readable medium storing instructions that, when executed by an electronic processor, cause the electronic processor to perform operations comprising the method of claim 1.

14. An audio method for producing an enhanced piece of audio data based on data in a modulation frequency domain, the audio method comprising:

receiving, from an input device, a piece of new audio data representing an input audio signal;

obtaining, by a processor, a specific spectral temporal amplitude (STA) as a time-frequency representation corresponding to a time point covered by the new audio data in a time domain;

obtaining a modulation spectrum measure (MSM) for the time point having an acoustic band dimension and a modulation band dimension from one or more STAs obtained from the new audio data;

computing, based on the MSM, a diffuseness indicator (DI) that indicates a degree of diffuseness in a modulation frequency domain for the piece of the new audio data, wherein a higher DI indicates a more reverberant or noisy audio signal represented by the piece of the new audio data;

generating an enhanced STA that filters reverberation and other noise from the specific STA;

calculating one or more features from the enhanced STA;

creating one or more feature vectors using the DI and the one or more features;

determining an estimate of an extent of speech in the piece of the new audio data based on the one or more feature vectors;

updating the piece of the new audio data based on the estimate of the extent of speech to produce the enhanced piece of audio data representing an output audio signal that is less reverberant or noisy than the input audio signal; and transmitting the enhanced piece of audio data to an output device, wherein generating the enhanced STA comprises applying a machine learning model trained with spectral temporal amplitude data corresponding to varying degrees of reverberation and other noise as input data and corresponding spectral temporal amplitude data corresponding to only clean speech as output data.

15. The audio method of claim 14, further comprising extracting, from application of the machine learning model, features that characterize the clean speech, including a low cutoff modulation frequency and a high cutoff modulation frequency.

16. A system, comprising:

at least one processor; and at least one memory including program code, wherein the at least one memory and the program code are configured to, with the at least one processor, cause the system at least to perform the audio method of claim 14.

17. A non-transitory computer-readable medium storing instructions that, when executed by an electronic processor, cause the electronic processor to perform operations comprising the method of claim 14.

18. An audio method for producing an enhanced piece of audio data based on data in a modulation frequency domain, the audio method comprising:

receiving, from an input device, a piece of new audio data representing an input audio signal;

obtaining, by a processor, a specific spectral temporal amplitude (STA) as a time-frequency representation corresponding to a time point covered by the new audio data in a time domain;

obtaining a modulation spectrum measure (MSM) for the time point having an acoustic band dimension and a modulation band dimension from one or more STAs obtained from the new audio data;

computing, based on the MSM, a diffuseness indicator (DI) that indicates a degree of diffuseness in a modulation frequency domain for the piece of the new audio data, wherein a higher DI indicates a more reverberant or noisy audio signal represented by the piece of the new audio data;

generating an enhanced STA that filters reverberation and other noise from the specific STA;

calculating one or more features from the enhanced STA;

creating one or more feature vectors using the DI and the one or more features;

determining an estimate of an extent of speech in the piece of the new audio data based on the one or more feature vectors;

updating the piece of the new audio data based on the estimate of the extent of speech to produce the enhanced piece of audio data representing an output audio signal that is less reverberant or noisy than the input audio signal; and transmitting the enhanced piece of audio data to an output device, wherein the calculating comprises computing an enhanced spectral flatness (SFT) through using the enhanced STA instead of the STA and summing over time values in a computation of the SFT.

19. An audio method for producing an enhanced piece of audio data based on data in a modulation frequency domain, the audio method comprising:

receiving, from an input device, a piece of new audio data representing an input audio signal;

obtaining, by a processor, a specific spectral temporal amplitude (STA) as a time-frequency representation corresponding to a time point covered by the new audio data in a time domain;

obtaining a modulation spectrum measure (MSM) for the time point having an acoustic band dimension and a modulation band dimension from one or more STAs obtained from the new audio data;

computing, based on the MSM, a diffuseness indicator (DI) that indicates a degree of diffuseness in a modulation frequency domain for the piece of the new audio data, wherein a higher DI indicates a more reverberant or noisy audio signal represented by the piece of the new audio data;

generating an enhanced STA that filters reverberation and other noise from the specific STA;

calculating one or more features from the enhanced STA;

creating one or more feature vectors using the DI and the one or more features;

determining an estimate of an extent of speech in the piece of the new audio data based on the one or more feature vectors;

updating the piece of the new audio data based on the estimate of the extent of speech to produce the enhanced piece of audio data representing an output audio signal that is less reverberant or noisy than the input audio signal; and transmitting the enhanced piece of audio data to an output device, wherein the one or more features include a spectral crest based on a sum of peak bands to other bands power ratio, a spectral crest based on peak to average (without peak band) power ratio, a variance or standard deviation of adjacent spectral band power, a sum or maximum of spectral band power difference among adjacent frequency bands, a spectral spread or spectral variance around a spectral centroid, and a spectral entropy.

20. An audio method for producing an enhanced piece of audio data based on data in a modulation frequency domain, the audio method comprising:

receiving, from an input device, a piece of new audio data representing an input audio signal;

obtaining, by a processor, a specific spectral temporal amplitude (STA) as a time-frequency representation corresponding to a time point covered by the new audio data in a time domain;

obtaining a modulation spectrum measure (MSM) for the time point having an acoustic band dimension and a modulation band dimension from one or more STAs obtained from the new audio data;

computing, based on the MSM, a diffuseness indicator (DI) that indicates a degree of diffuseness in a modulation frequency domain for the piece of the new audio data, wherein a higher DI indicates a more reverberant or noisy audio signal represented by the piece of the new audio data;

generating an enhanced STA that filters reverberation and other noise from the specific STA;

calculating one or more features from the enhanced STA;

creating one or more feature vectors using the DI and the one or more features;

determining an estimate of an extent of speech in the piece of the new audio data based on the one or more feature vectors;

updating the piece of the new audio data based on the estimate of the extent of speech to produce the enhanced piece of audio data representing an output audio signal that is less reverberant or noisy than the input audio signal; and transmitting the enhanced piece of audio data to an output device, wherein the determining comprises applying a machine learning model trained with one or more features of spectral temporal amplitude data corresponding to clean speech and of spectral temporal amplitude data corresponding to varying degrees of reverberation and other noise as input data and with corresponding extents of speech as output data.

* * * * *